United States Patent Office 2,815,424
Patented Dec. 3, 1957

2,815,424

STRAIN GAGE

Giles Warren Painter, Erie, Pa., assignor to Lord Manufacturing Company, Erie, Pa., a corporation of Pennsylvania Application January 17, 1955, Serial No. 481,992

5 Claims. (Cl. 201—63)

This invention is intended to measure the strain in elastomers and is particularly useful in irregular sections which may have points of stress concentration at which the strain cannot be readily calculated or observed.

Figure 1:
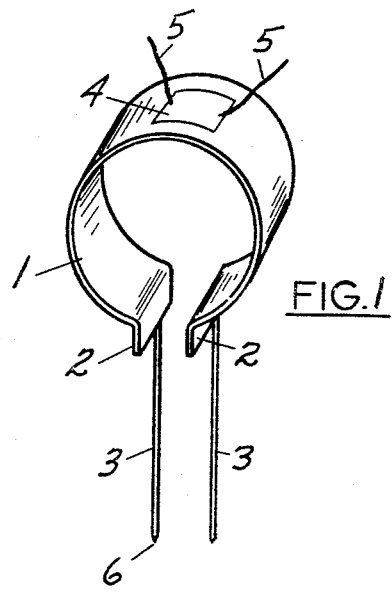
Figure 2:
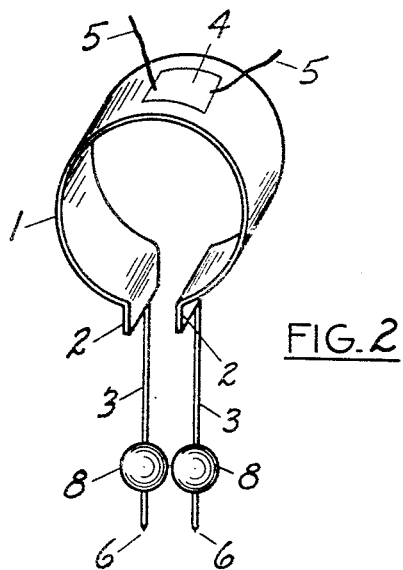
Figure 3:
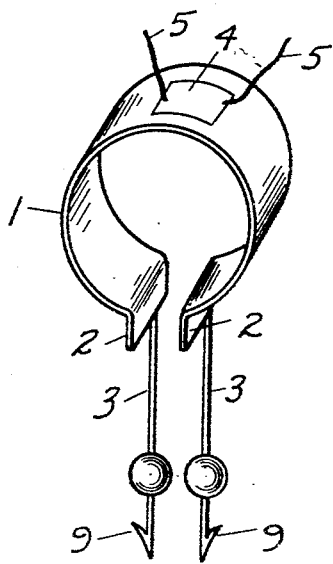
Figure 4:
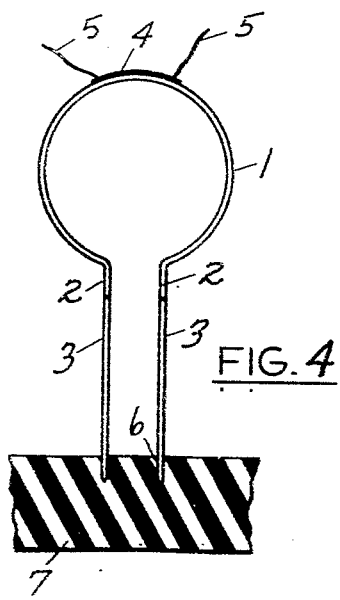

In the drawing, Fig. 1 is a perspective of a strain gage, Figs. 2 and 3 are perspectives of modifications and Fig. 4 is an elevation of the Fig. 1 gage mounted in strain measuring position on an elastomer.

In each of the strain gages illustrated in Figs. 1, 2 and 3 there is an arcuate spring member 1 having spaced ends 2 to which are fixed needles 3. The spring member 1 is made of spring material such as Phosphor bronze and of such dimensions as to offer neglible resistance to flexing of the spring member by moving the ends 2 toward and away from each other. The spring member 1 can be of very small dimensions so as to permit use in confined spaces. The gap between the needles can be much smaller than the diameter of the spring member 1 which is useful in the measurement of strain in fillets or similar sections. At a point where the spring members undergo substantial deflection are fixed resistance strain gages 4 which measure the strain in the spring member 1 by a change in resistance of the strain gages 4. The resistance strain gages 4 are a convenient means for measuring the strain in the spring members. Other strain measuring means are known. The numerical magnitude of the strain in the spring member 1 can be determined by connecting leads 5 on the strain gages 4 to any suitable resistance measuring circuit.

In the simplest strain gage illustrated in Fig. 1, the needles 3 have plain points 6 which are pressed into a surface of an elastomer 7 at a point at which the strain is to be measured. As the elastomer is stressed, the needles 3 move toward or away from each other depending upon the direction of the strain and the separation of the needles is reflected as a corresponding strain in the strain measuring elements 4. Since the spring member 1 offers negligible restraint, the strain indicated by the change in value of the strain measuring elements 4 is due to the strain in the elastomer between the needle points 6. The frictional gripping force on the needle points 6 is ordinarily sufficient to keep the strain gage in place on the elastomer.

The strain gage of Fig. 2 is used in the same manner as the strain gage of Fig. 1. The advantage of the Fig. 2 strain gage is that beads 8 spaced a fixed distance from the needle points 6 determine both the spacing of the needles 3 and the depth of penetration of the needle points 6 when the strain gage is mounted on an elastomer. Having a controlled spacing of the needles 3 determines the initial or starting position of the strain measuring element 4. The controlled depth of penetration of the needle points 6 determines the cross-sectional area of the elastomer in which strain is measured. This permits a more precise measurement of the strain in the elastomer.

The strain gage of Fig. 3 is likewise used in the same manner as the strain gages of Figs. 1 and 2. The advantage of the Fig. 3 strain gage is that the needle points 6 have barbs 9 which hold the needle points 6 embedded under conditions of vibration. The barbs 9 are not needed under ordinary conditions as the inherent resilience of the elastomer tends to grip the needle points and hold them in place.

All of the strain gages are usable under static and dynamic conditions. That is, all of the strain gages can measure the strain in an elastomer under static stress as well as under dynamic or rapidly changing stress. All of the strain gages can be made in very small sizes so as to permit the use in confined spaces.

What is claimed as new is:

1. A strain gage for measuring the strain in elastomers comprising a pair of needles having spaced points to be stuck into spaced points on the surface of an elastomer between which strain is to be measured, beads on the needles spaced from the ends of the points of the needles for limiting the penetration of the points into the elastomer, a spring member arched between the needles so as to be deflected in proportion to the movement of the needles toward and away from each other, and a strain measuring element responsive to the deflection of said spring member.

2. A strain gage for measuring the strain in elastomers comprising a pair of needles having spaced points to be stuck into spaced points on the surface of an elastomer between which strain is to be measured, barb means on the needle points resisting removal of the needle points from the elastomer, a spring member arched between the needles so as to be deflected in proportion to the movement of the needles toward and away from each other, and a strain measuring element responsive to the deflection of said spring member.

3. A strain gage for measuring the strain in elastomers comprising a pair of needles having spaced points to be stuck into spaced points on the surface of an elastomer between which strain is to be measured, spacer means on at least one of the needles cooperating with the other of the needles to fix the spacing of the needles when initially stuck into the elastomer, a spring member arched between the needles so as to be deflected in proportion to the movement of the needles toward and away from each other, and a strain measuring element responsive to the deflection of said spring member.

4. A strain gage for measuring the strain in elastomers comprising a pair of needles having spaced points to be stuck into spaced points on the surface of an elastomer between which strain is to be measured and to be held in place by the inherent resilience of the elastomer gripping the needle points, an arcuate spring member having spaced ends converging toward and fixed to the needles so the spring member is deflected in proportion to the movement of the needles toward and away from each other, the diameter of the spring being substantially greater than the spacing between said ends of the spring, and a resistance strain gage element mounted on said spring member so as to be strained by the deflection of the spring member.

5. A self supporting strain gage for measuring the strain in elastomers comprising a pair of spaced needles adapted to be stuck into spaced points on the surface of an elastomer between which strain is to be measured, each of said needles having a sharp point at one end of a long slender substantially cylindrical body, the diameter of the body of the needle being small enough so that when the point of the needle is stuck into the elastomer the body of the needle readily penetrates the elastomer to a depth many times the diameter of the body of the needle without materially upsetting the normal stress pattern in the elastomer and the friction grip on the penetrated portion of the body of the needle is sufficient to make the strain gage self supporting in all positions and under both static and dynamic loads, a spring member connected between the needles so as to be deflected in proportion to the movement of the needles toward and away from each other, and a strain measuring element responsive to the deflection of said spring member.

References Cited in the file of this patent
UNITED STATES PATENTS

| | | |
|---|---|---|
| 1,773,114 | Mueller | Aug. 19, 1930 |
| 2,316,975 | Ruge | Apr. 20, 1943 |
| 2,416,664 | Ruge | Feb. 25, 1947 |
| 2,419,061 | Emery | Apr. 15, 1947 |
| 2,423,867 | Zener et al. | July 15, 1947 |
| 2,744,181 | Rea | May 1, 1956 |